(12) United States Patent
Girault

(10) Patent No.: US 11,344,107 B1
(45) Date of Patent: May 31, 2022

(54) ELECTRONIC HANDHELD CAMERA SUPPORTER

(71) Applicant: Dimitri Girault, Miramar, FL (US)

(72) Inventor: Dimitri Girault, Miramar, FL (US)

( * ) Notice: Subject to any disclaimer, the term of this patent is extended or adjusted under 35 U.S.C. 154(b) by 0 days.

(21) Appl. No.: 17/151,217

(22) Filed: Jan. 18, 2021

Related U.S. Application Data

(63) Continuation of application No. 16/006,772, filed on Jun. 12, 2018, now abandoned, which is a
(Continued)

(51) Int. Cl.
*A45F 5/10* (2006.01)
*F16M 13/04* (2006.01)
(Continued)

(52) U.S. Cl.
CPC ........... *A45F 5/102* (2013.01); *F16M 11/041* (2013.01); *F16M 11/125* (2013.01); *F16M 13/04* (2013.01); *A45F 2005/006* (2013.01); *A45F 2005/1066* (2013.01); *A45F 2200/0525* (2013.01); *G06F 1/163* (2013.01); *G06F 1/1632* (2013.01)

(58) Field of Classification Search
CPC ... B25G 3/38; B25G 1/06; B25G 1/00; B25G 3/26; B25G 3/24; B25G 3/20; B25G 3/12; F16M 13/00; F16M 13/04; F16M 11/105; F16M 13/02; F16M 11/125; G06F 1/1632; G06F 1/1613; G06F 1/1607; G06F 1/1637; G06F 1/1626; G06F 1/166; G06F 1/1633; G06F 1/181; G06F 1/1679; H04M 1/6075; A45F 2200/0516; A45F 2200/0525; A45F 5/00; A45F 5/10; A45F 2005/006; A45F 2005/1006; A45F 2005/108; A45F 2200/0533; A45F 3/14; A45C 2013/025; H05K 5/023; H05K 5/0234; H05K 5/00; H05K 5/0204; H05K 5/0217; H05K 5/0247; H04N 5/2252; A63F 13/92; A63F 13/98; B60R 2011/0075; B60R 2011/008
See application file for complete search history.

(56) References Cited

U.S. PATENT DOCUMENTS

| | | | |
|---|---|---|---|
| 8,770,539 B1 * | 7/2014 | Hsu ........................ | F16M 13/04 248/688 |
| 2001/0013890 A1 * | 8/2001 | Narayanaswami .. | H04N 5/2251 348/E5.025 |

(Continued)

FOREIGN PATENT DOCUMENTS

| | | | | |
|---|---|---|---|---|
| GB | 2521865 A | * | 7/2015 | ............. F16M 11/10 |
| GB | 2523807 A | * | 9/2015 | ............. F16M 11/10 |

Primary Examiner — Michael A Matey

(57) ABSTRACT

A multi-media tablet holder is provided and includes a first retention member, a second retention member, a pair of slide pins, at least one extension spring and a handle. The first retention member includes a first retention plate and a first retention rail. The second retention member includes a second retention plate and a second retention rail. The first and second retention rails are sized to receive a thickness of a multi-media tablet. There is also provided a multi-media tablet holder including a retention member, a handle assembly and an articulating mechanism for pivoting and rotating the retention member relative to the handle assembly.

21 Claims, 14 Drawing Sheets

Related U.S. Application Data continuation-in-part of application No. 15/207,480, filed on Jul. 11, 2016, now Pat. No. 9,995,432, which is a continuation-in-part of application No. 14/044,038, filed on Oct. 2, 2013, now Pat. No. 9,388,939.

(60) Provisional application No. 61/709,298, filed on Oct. 3, 2012.

(51) Int. Cl.
*F16M 11/04* (2006.01)
*F16M 11/12* (2006.01)
*G06F 1/16* (2006.01)
*A45F 5/00* (2006.01)

(56) References Cited

U.S. PATENT DOCUMENTS

| | | | |
|---|---|---|---|
| 2005/0122416 A1* | 6/2005 | Ryu | H04N 5/23203 348/E5.026 |
| 2006/0257137 A1* | 11/2006 | Fromm | F16M 13/04 396/420 |
| 2006/0257138 A1* | 11/2006 | Fromm | F16M 13/00 396/420 |
| 2008/0079820 A1* | 4/2008 | McSpadden | H04N 5/76 348/E7.085 |
| 2009/0009936 A1* | 1/2009 | Neu | H04B 1/3877 361/679.01 |
| 2010/0214470 A1* | 8/2010 | Cottagnoud | G05G 1/06 348/E5.042 |
| 2011/0255226 A1* | 10/2011 | Duncan | F16M 13/02 361/679.01 |
| 2012/0062691 A1* | 3/2012 | Fowler | G03B 17/56 348/E5.026 |
| 2013/0176669 A1* | 7/2013 | Takahashi | F16M 11/105 361/679.01 |
| 2014/0269553 A1* | 9/2014 | Stein | H04W 12/50 370/329 |
| 2014/0354839 A1* | 12/2014 | Yu | G03B 17/38 348/211.99 |
| 2015/0076297 A1* | 3/2015 | Parrill | F16M 13/04 248/176.3 |

\* cited by examiner

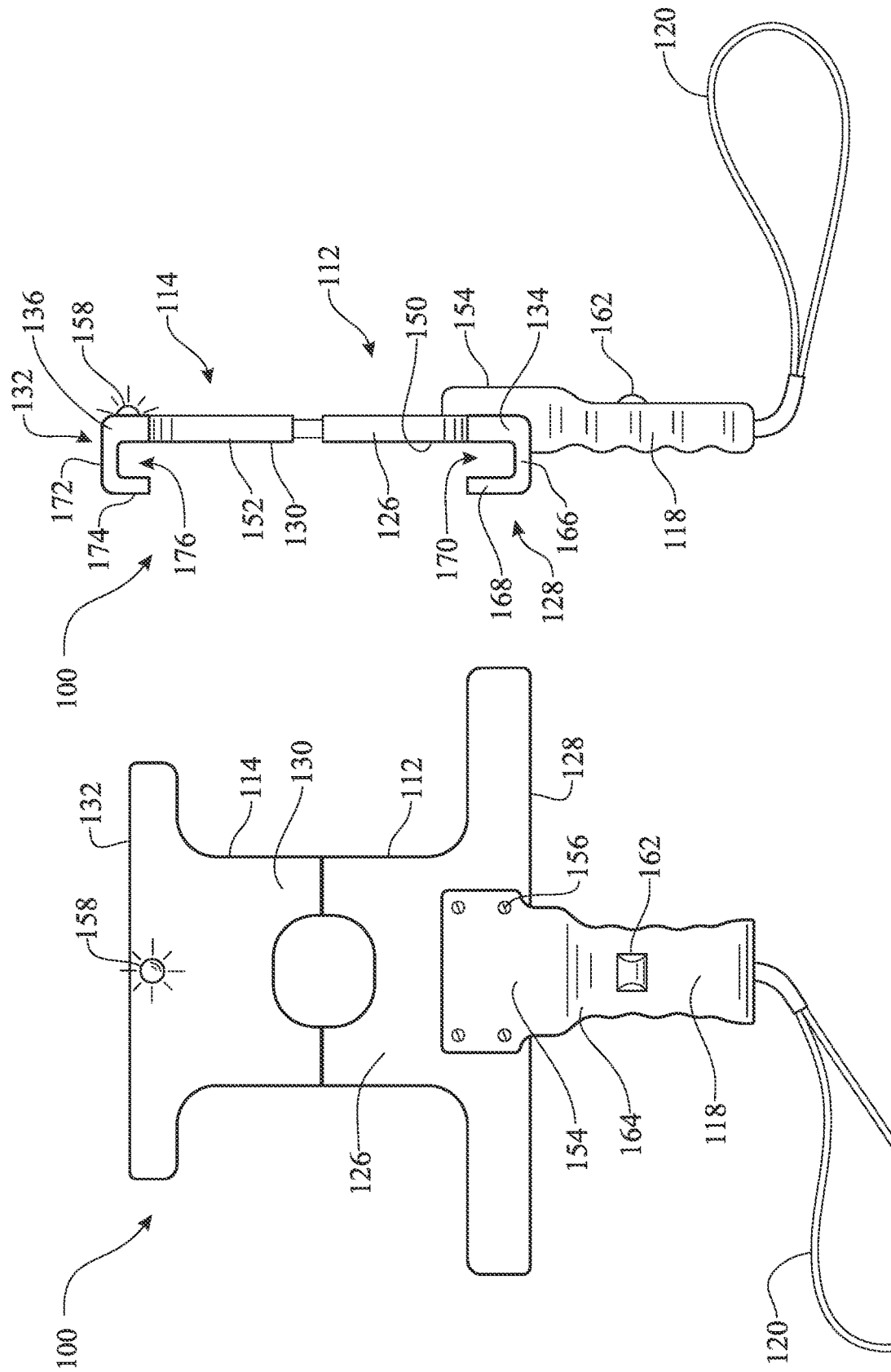

ELECTRONIC HANDHELD CAMERA SUPPORTER

CROSS-REFERENCE TO RELATED APPLICATION

This Non-Provisional Utility application claims the benefit of U.S. Provisional Patent Application Ser. No. 61/709,298, filed on Oct. 3, 2012, which is incorporated herein in its entirety.

FIELD OF THE INVENTION

The present disclosure relates to hand held electronic devices. More particularly, the present disclosure relates to a multi-media tablet holder, which allows a user to hold a multi-media tablet with one hand instead of two hands or to increase stability when using two hands to hold the multi-media tablet.

BACKGROUND OF THE INVENTION

The present invention provides a multi-media tablet holder. Various multi-media tablet holders are know in the art for use in supporting a multi-media tablet relative to a fixed surface such as, for example, table tops, automotive dash boards or seats, etc.

However, it is very difficult to hand hold a multi-media tablet with a single hand to capture video images when operating the multi-media device freehand. Owners of multi-media tablets use them to capture video images at different venues and events. The drawback to multi-media tablets is their lack of handles, grooves, or grips or other provision for grasping it for capturing video images. The smooth and flat design of the multi-media tablets makes it difficult or impossible to grasp with only one hand. Further, using only one hand to grip the multi-media tablet will result in poor video quality due to a lack of stability. Further, one hand operation increases the likelihood of the multi-media tablet being dropped. Dropping the multi-media tablet will probably result in the case or the screen being cracked. Repair of a multi-media tablet is very expensive. Further, multi-media tablets do not have light sources which are needed to film in poorly lit areas typically encountered when walking around to film.

Accordingly, there remains a need in the art for a multi-media tablet holder allowing a user to hand hold a multi-media tablet with a single hand of a user. There further exists a need in the art for a multi-media tablet holder incorporating a light emitting device to enhance the ability of the multi-media tablet to film clear and bright still pictures or video.

SUMMARY OF THE INVENTION

The present invention overcomes the deficiencies of the known art and the problems that remain unsolved by providing an apparatus for supporting and controlling a multi-media tablet with a single hand of a user.

In accordance with one embodiment of the present invention, the invention consists of a multi-media tablet holder comprising:

a first retention member having a first retention plate and a first retention rail extending from the first retention plate, the first retention rail defining a first channel for receipt of a first edge of a multi-media tablet;

a second retention member movably mounted to the first retention member and having a second retention plate and a second retention rail extending from the second retention plate, the second retention rail defining a second channel for receipt of a second edge of the multi-media tablet;

a handle assembly including a hand grip attached to the first retention member; and at least one slide affixed to one of the first and second retention members and movably mounted relative to the other of the first and second retention members.

In a second aspect, the first and second channels are sized to receive a thickness of the multi-media tablet.

In another aspect, the at least one slide includes a pair of slide pins.

In another aspect, an extension spring is affixed at one end to the first retention member and at an opposite end to the second retention member.

In another aspect, a light emitting device is provided and is located on a front surface of the second retention member.

In another aspect, a switch for controlling the light emitting device is provided and is positioned on the hand grip.

In another aspect, the hand grip is attached to the first retention member by a plate extending from the hand grip.

In another aspect, the plate is affixed to the first retention member.

In another aspect, the plate is pivotally affixed to the first retention member by a pivot pin such that the hand grip can rotate relative to the first retention member.

In another aspect, the hand grip includes finger grooves and the switch is located within one of the finger grooves.

Introducing another embodiment, a multi-media tablet holder for use in supporting a multi-media tablet with a single hand of a user is provided comprising:

a retention member having a retention plate and a retention rail extending from the retention plate;

a handle assembly including a handle member; and an articulating mechanism pivotally mounted to the handle assembly and rotatably mounted to the retention member.

In another aspect, the retention rail defines a channel for receipt of an upper, a lower and a side edge of a multi-media tablet, the channel extending around an upper edge, a closed side edge and a lower edge of the retention plate.

In another aspect, the handle assembly includes a support member extending from an upper end of the handle member.

In another aspect, the support member includes a light emitting device and the handle member includes a touch screen for operating the light emitting device.

In another aspect, the articulating mechanism includes a support plate pivotally mounted on the support member and a ratchet plate affixed to the retention plate and rotatably mounted on the support plate.

In another aspect, the support plate is pivotally mounted to the support member by a hinge.

In another aspect, the ratchet plate includes ratchet teeth engagable with the support plate to incrementally rotate the retention member relative to the handle assembly.

In another aspect, the retention plate includes a hole to accommodate a camera lens of the multi-media tablet and at least one tab engagable with an edge of the multi-media tablet to releasably retain the multi-media tablet within the retention member.

Introducing a further embodiment, a multi-media tablet holder having an integrated system for support and use with a multi-media tablet is provided comprising:

a retention member for receipt of a multi-media tablet and having a retention plate and a retention rail;

a handle assembly including a handle member and attached to the retention member;

a controller positioned within one of the retention member and handle assembly;

a memory module linked to the controller;

a user input in the form of a touch screen on the handle member, the user input being linked to the controller; and a wired interface linked to the controller and in direct communication with a wired interface of the multi-media tablet.

In another aspect, a camera and light emitting device are mounted on the handle assembly and linked to the controller.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the drawings provided to illustrate and not to limit the invention, in which:

FIG. 4 presents a front elevation view of the multi-media tablet holder of FIG. 1;

FIG. 5 presents a side elevation view of the multi-media tablet holder of FIG. 1 with the first and second retention members fully extended;

Like reference numerals refer to like parts throughout the several view of the drawings.

DETAILED DESCRIPTION OF DRAWINGS

The following detailed is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
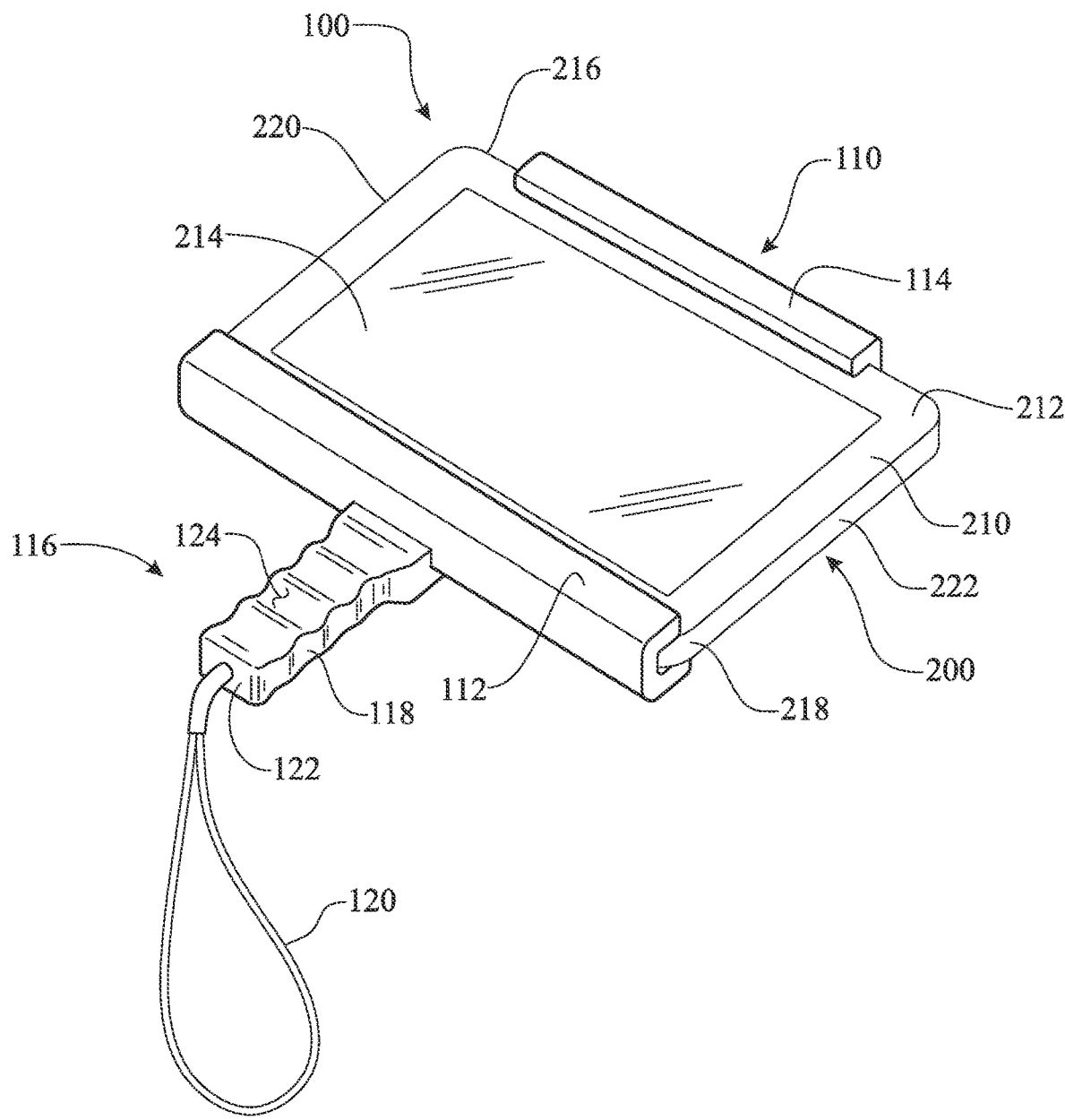
FIG. 1 presents a perspective view of a multi-media tablet holder retaining a multi-media tablet.
Figure 2:
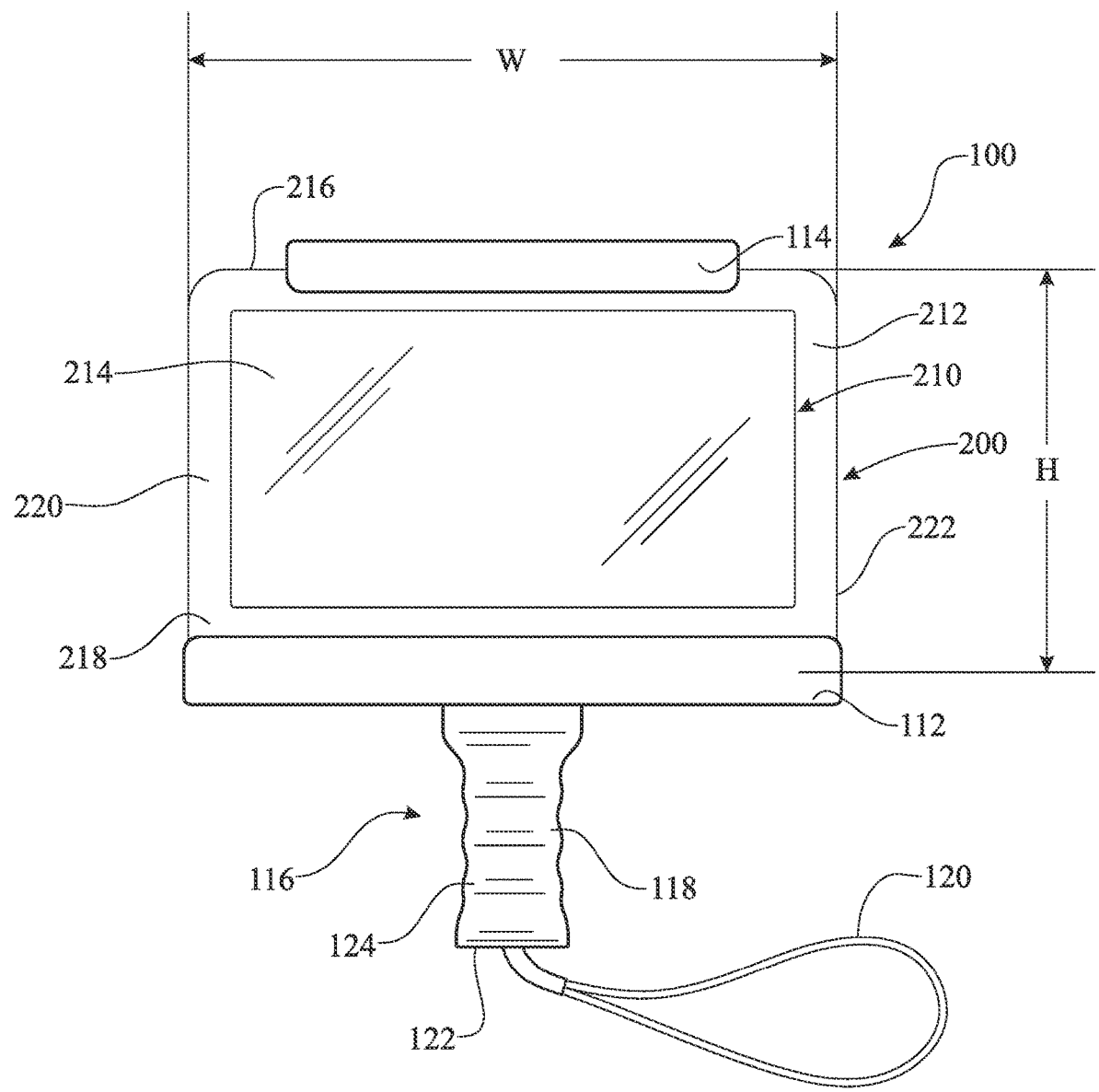
FIG. 2 presents a rear elevation view of the multi-media tablet holder of FIG. 1 retaining the multi-media tablet.

Referring to FIGS. 1-5, and initially with regard to FIGS. 1 and 2, there is disclosed a multi-media tablet holder 100 for use in supporting and manipulating a multi-media tablet 200 with a single hand of a user. The multi-media tablet holder 100 generally includes a retention assembly 110, including first and second retention members 112 and 114, respectively, and a handle assembly 116 mounted to the first retention member 112. The handle assembly 116 is affixed to the first retention member 112 and generally includes a handle member 118 and a flexible wrist loop or lanyard 120 extending from a bottom end 122 of the handle member 118. The handle member 118 may have a foam or other grip enhancing surface 124 to facilitate grasping by the user.

The multi-media tablet 200 is of the type used to access the internet, play games, view or create videos, etc. The multi-media tablet 200 generally includes a body portion 210 having a frame 212 and a touch screen 214. The frame 212 of the body portion 210 has an upper edge 216, a lower edge 218 and first and second side edges 220 and 222, respectively. As best shown in FIG. 2, the multi-media tablet holder 100 is designed to retain multi-media tablets 200 having various widths "w" and heights "h".

Figure 3:
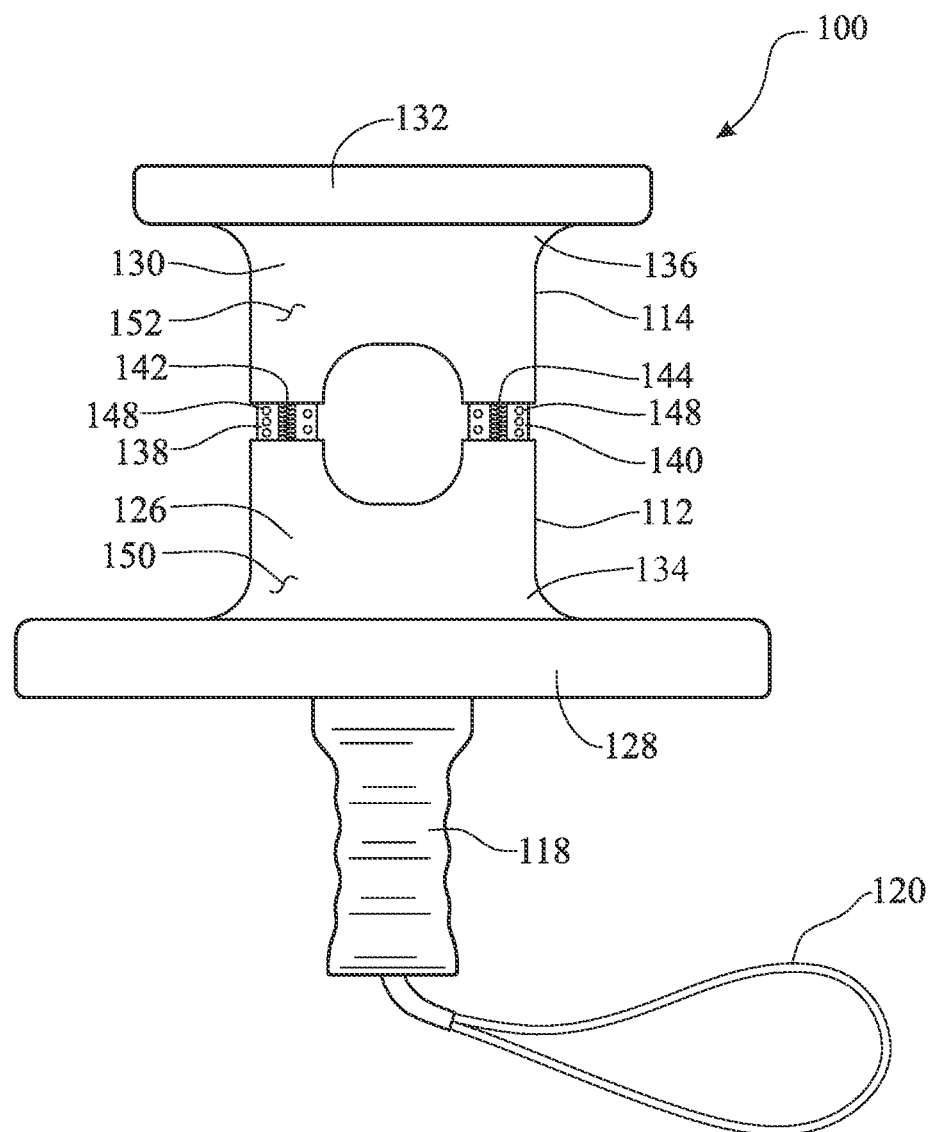
FIG. 3 presents a rear elevation view of the multi-media tablet holder of FIG. 1 with a first and a second retention members fully extended.

Referring now to FIG. 3, the first retention member 112 includes a first retention plate 126 and a first retention rail 128. The second retention member 114 includes a second retention plate 130 and a second retention rail 132. The first retention rail 128 is formed on a lower end 134 of the first retention plate 126. The second retention rail 132 is formed on an upper 136 end of the second retention plate 130. The first and second retention rails 128 and 132, respectively, are sized to receive a thickness of a multi-media tablet 200 in a manner described in more detail hereinbelow.

The second retention member 114 is movably mounted relative to the first retention member 112 to capture and secure the multi-media tablet 200 between the first and second retention rails 128 and 132. A pair of slide pins 138 and 140 are affixed to one of the first and second retention members 112 and 114 and are slidably received in a hole or gap (not shown) formed in the other of the first and second retention members 112 and 114. A pair of extension springs 142 and 144 are provided adjacent the pair of slide pins 138 and 140 and are affixed to the first and second retentions plates 126 and 130. Additionally, a pair of a series of bumps or detent mechanisms 146 and 148 are associated with the pair of slide pins 138 and 140 to allow the second retention member 114 to be positioned relative to the first retention member 112 in discrete increments. The extension springs 142 and 144 are affixed to rear surfaces 150 and 152 of the first and second retention plates 126 and 130, respectively, and bias the second retention member 114 toward the first retention member 112 to secure the multi-media tablet 200 therebetween.

Referring now to FIG. 4, the handle assembly 116 includes an attachment plate 154, extending from the handle member 118, and affixed to the first retention member 112 by fasteners, such as, for example, screws 156. Alternatively, the attachment plate 154 may be affixed to the first retention plate 126 by other known methods such as, for example, adhesives, welding, etc. Still further, the handle assembly 116 may be integrally formed with the first retention member 112. The handle member 118 is critical to the usefulness of the multi-media tablet holder 100, because it allows the user to hold the multi-media tablet 200 with a single hand or increase the stability with a second hand.

With continued reference to FIG. 4, the multi-media tablet holder 100 is additionally provided with a light emitting device 158 to assist in taking pictures with a camera 232 (FIG. 15) of the multi-media tablet 200. The light emitting device 158 illuminates the subject matter of the picture and may include an incandescent bulb, a light emitting diode, or other light emitting source. The light emitting device 158 is provided on a front surface 160 of the second retention member 114. A switch 162 is provided on a front face 164 of the handle member 118 and is electronically connected to the light emitting device 158 via known methods to turn the light emitting device 158 on and off.

Referring now to FIG. 5, the first retention rail 128 projects rearward from the rear surface 150 of the first retention plate 126 and the second retention rail 132 projects rearward from the rear surface 152 of the second retention plate 130. The first retention rail 128 includes a first arm 166 projecting rearwardly from the lower end 134 of the first retention plate 126 and a first lip 168 extending upward from the first arm 166 to define a first channel 170. Likewise, the second retention rail 132 includes a second arm 172 projecting rearwardly from the upper end 136 of the second retention plate 130 and a second lip 174 extending downward from the second arm 172 to define a second channel 176. As noted herein above, the first and second retention rails 128 and 132 are sized to receive the thickness of multi-media tablet 200.

Figure 6A:
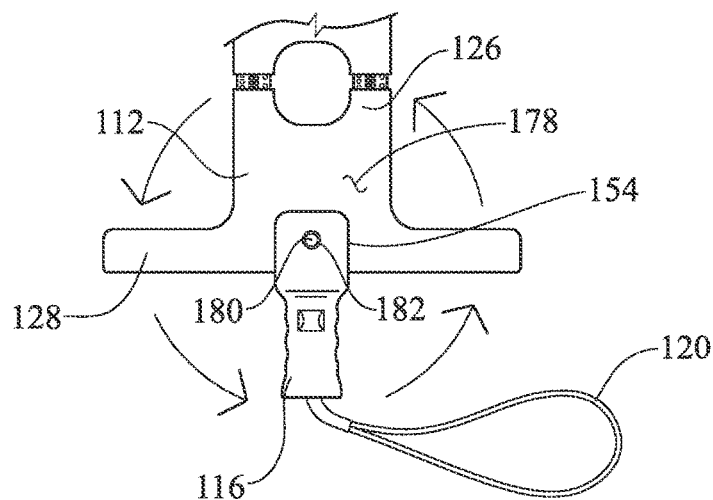
FIG. 6A presents a partial front elevation view of alternative embodiment of a multi-media tablet holder incorporating a handle pivotally attached to a front of a first retention member of the multi-media tablet holder.
Figure 6B:
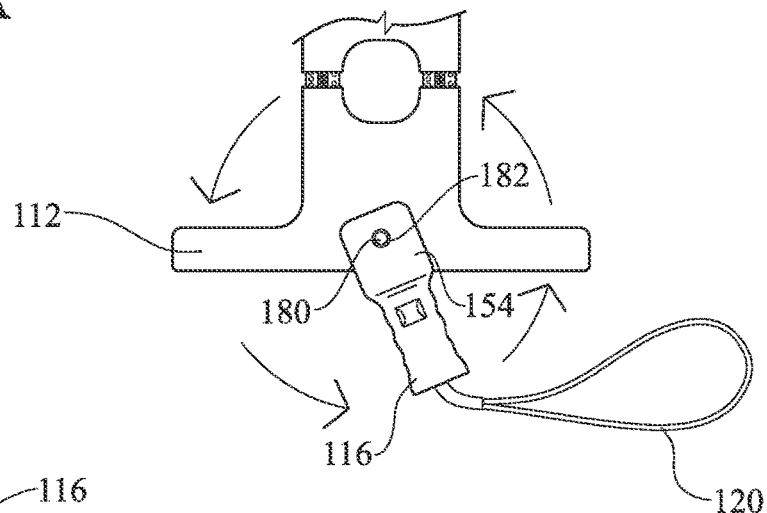
FIG. 6B presents a partial front view of the embodiment of FIG. 6A with the handle partially rotated relative to the first retention member of the multi-media tablet holder.
Figure 6C:
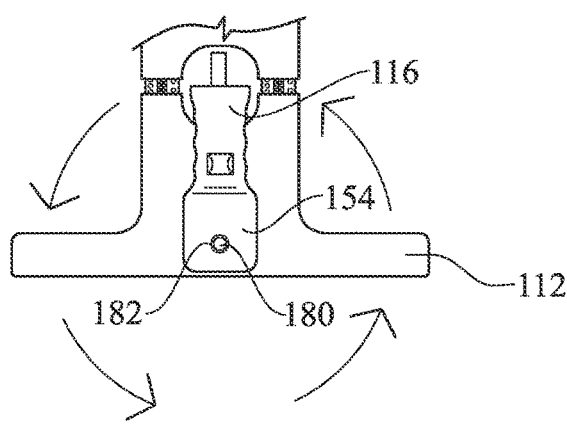
FIG. 6C presents a partial front view of the embodiment of FIG. 6A with the handle rotated 180 degrees relative to the first retention member of the multi-media tablet holder.

With reference to FIGS. 6A-6C, there is disclosed an alternative method of attaching the handle assembly 116 to the first retention member 112. In this embodiment, the handle assembly 116 is pivotally retained on a front surface 178 of the first retention plate 126 with a fastener or the like, instead of being rigidly attached. Specifically, a pivot bolt or pin 180 extends through a hole 182 on the attachment plate 154 of the handle assembly 116 and is affixed to the first retention member 112 at the first retention plate 126 or first retention rail 128. Thus, the handle assembly 116 is rotatable in the clockwise and counter clockwise directions relative to the first retention member 112 to aid in positioning the multi-media tablet 200 (not shown) or to "collapse" the multi-media tablet holder 100 for storage (FIG. 6C).

Figure 7A:
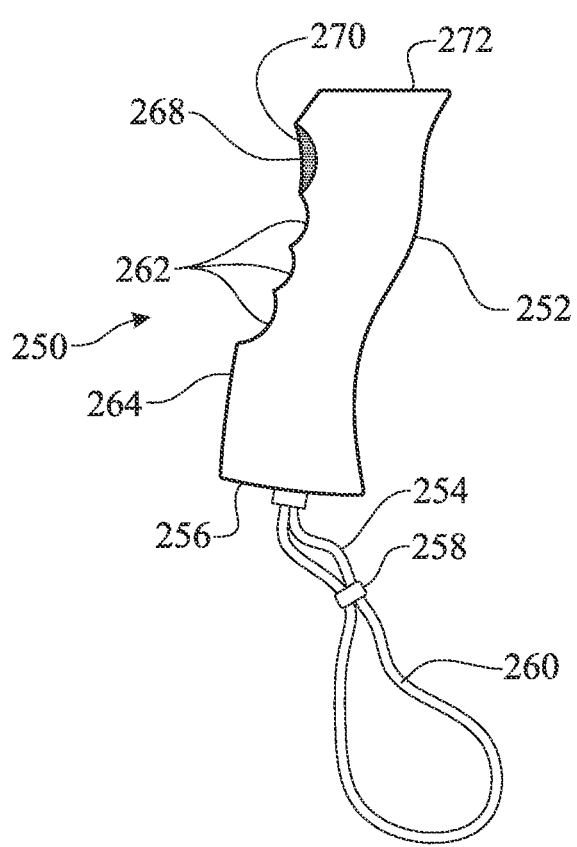
FIG. 7A presents a side elevation view of an ergonomic handle for use with the disclosed multi-media tablet holders.
Figure 7B:
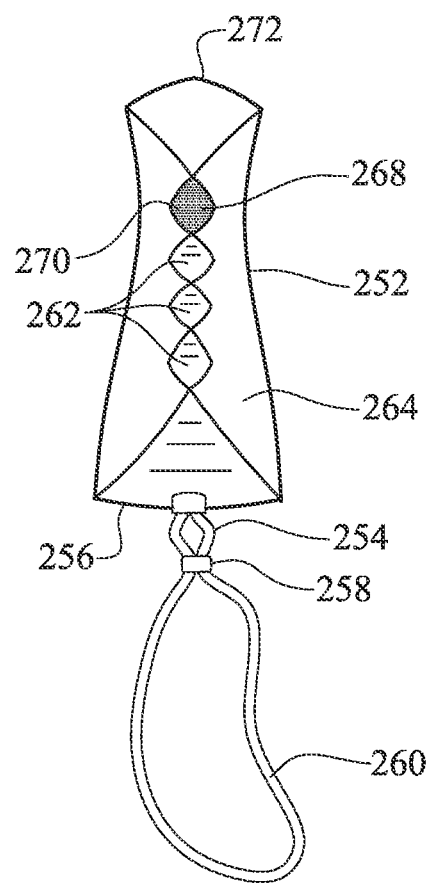
FIG. 7B presents a front elevation view of the ergonomic handle of FIG. 7A.

With reference for the moment to FIGS. 7A and 7B, there is disclosed an ergonomic handle assembly 250 for use with multi-media tablet holder 100 described hereinabove. The handle assembly 250 includes an ergonomic handle member 252 which is shaped to conform to a user's hand and a lanyard 254 for stabilizing the handle member 252 relative to a wrist of a user. The ergonomic handle member 252 allows the user to hold the multi-media tablet holder 100 with greater stability than the handle member 118 described hereinabove. Specifically, the handle member 250 has a pistol grip shape or side profile (FIG. 7A) and an hour glass shape or front profile (FIG. 7B). The lanyard 254 is attached to a bottom end 256 of the handle member 252 and includes a slide 258 for tightening or cinching a lower loop 260 of the lanyard 254 about the wrist of the user.

To further aid in gripping the handle member 252, a plurality of finger grooves 262 are formed or molded into a front surface 264 of the handle member 252. As noted above, the light emitting device 158 is incorporated in the multi-media tablet holder 100. The light emitting device 158 is critical to the capture of video by the multi-media tablet 200 in areas that are dark or poorly lit. The handle member 252 further includes a switch 268 formed within a first or upper groove 270 to activate the light emitting device 158. It should be noted that a top end 272 of the handle member 252 can be provided with the attachment plate 154 for attachment to the first retention member 112 by either the screws 156 (FIG. 4) or the pivot pin 180 (FIG. 6A).

Figure 8:
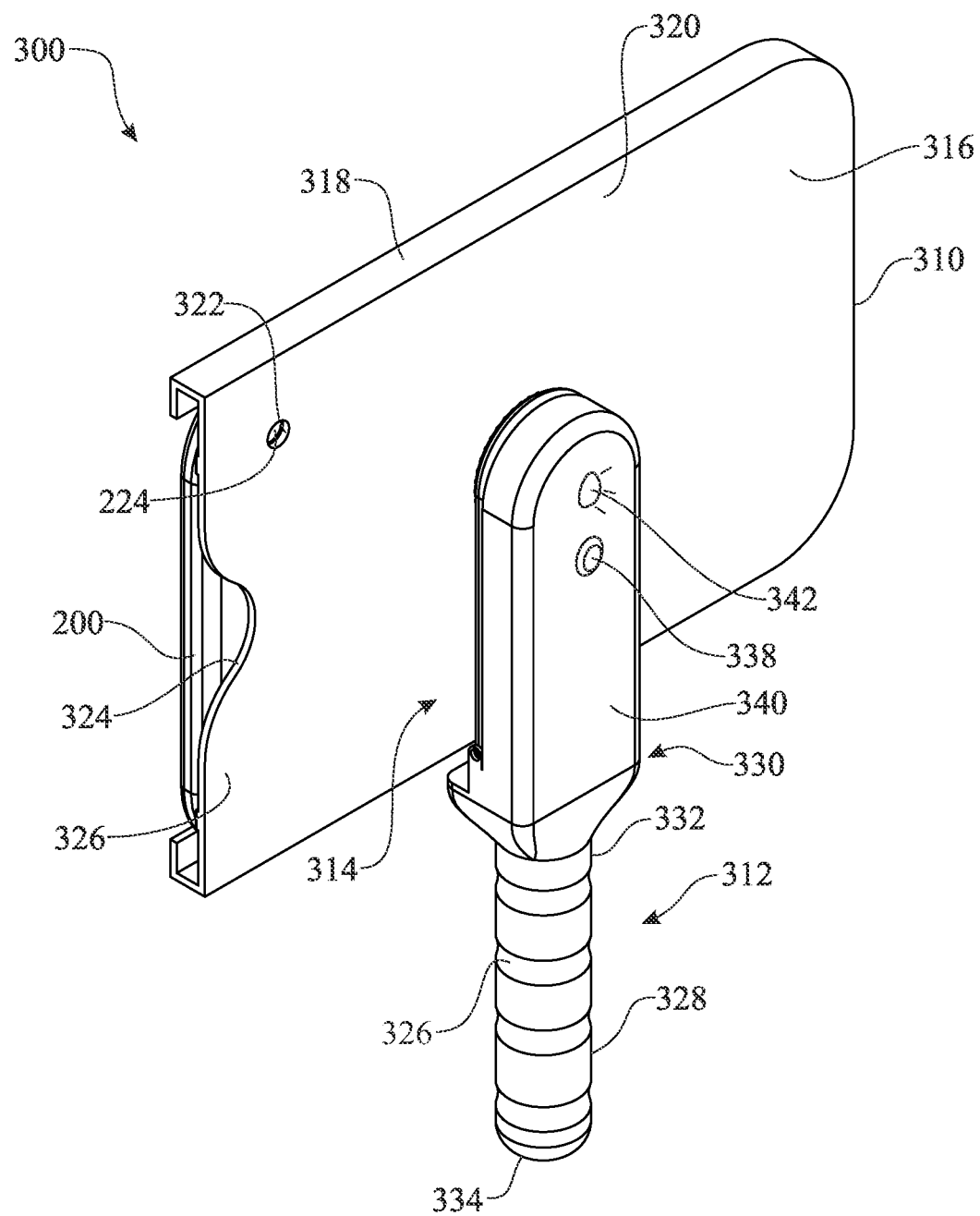
FIG. 8 presents a front perspective view of an alternate embodiment of a multi-media tablet holder retaining a multi-media tablet.
Figure 9:
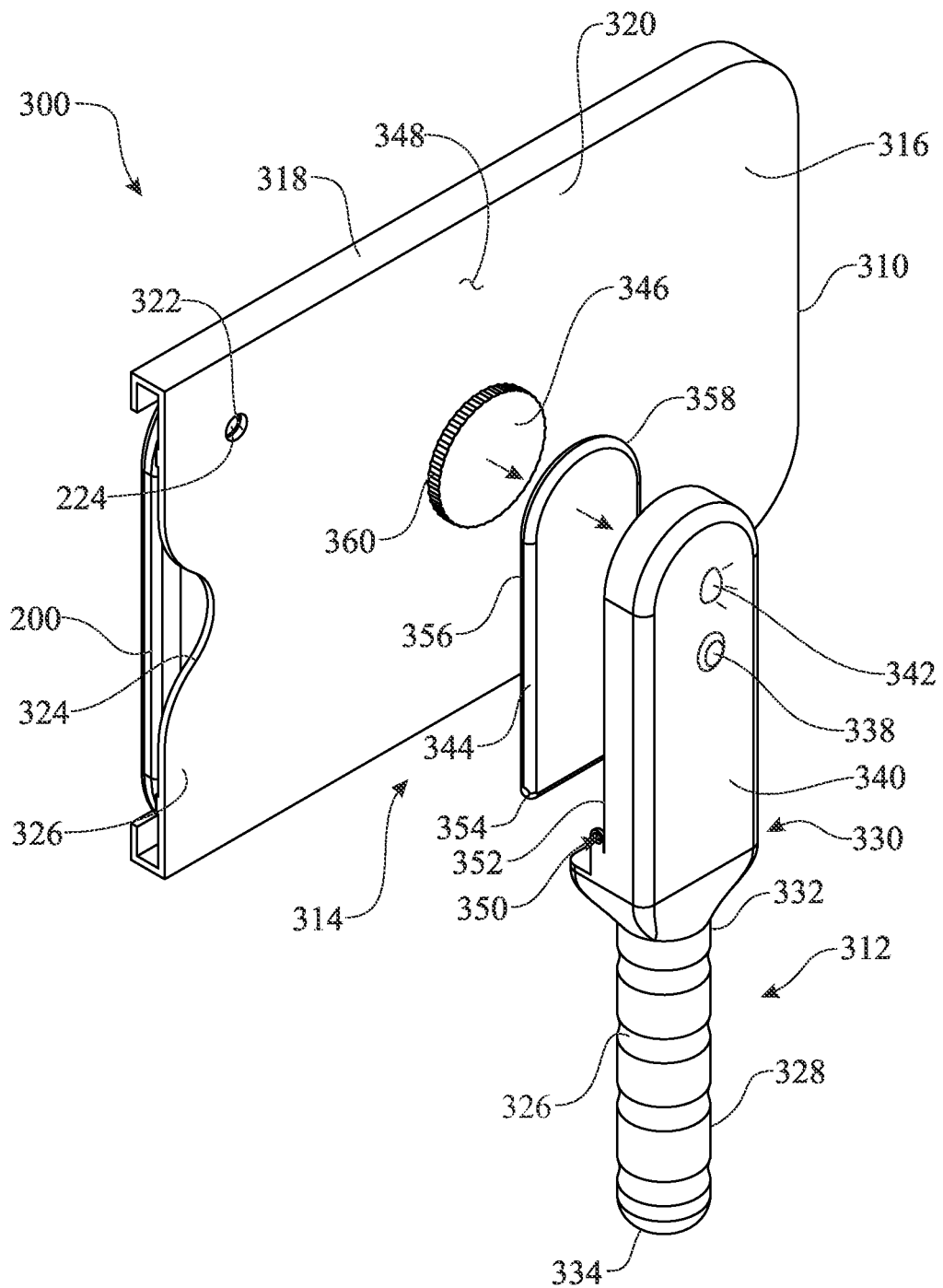
FIG. 9 presents a front perspective, exploded view of the multi-media tablet holder of FIG. 8.

Referring now to FIGS. 8-14, and initially with regard to FIGS. 8 and 9, there is disclosed an alternative embodiment of a multi-media tablet holder 300 for use in supporting and manipulating the multi-media tablet 200 with a single hand of a user. The multi-media tablet holder 300 generally includes a retention member 310, a handle assembly 312 and an articulating mechanism 314. The articulating mechanism 314 allows the user to pivot and/or rotate the retention member 310, and thus the multi-media tablet 200, relative to the handle assembly 312 to better position the multi-media tablet 200 for viewing or taking photographs or videos.

Similar to the first retention member 112 described hereinabove, the retention member 310 includes a retention plate 316 and a retention rail 318 formed around an outer edge 320 of the retention plate 316. The retention rail 318 is sized to accommodate the thickness of the multi-media tablet 200 in a manner similar to that described with regard to the first and second retention rails 128 and 132 above. In this embodiment, the retention member 112 additionally includes a camera hole 322 formed through the retention plate 316 to accommodate a camera lens 224 of multi-media tablet 200. A cut out 324 is provided along an open end 326 of the retention member 310 to assist in pressing on the multi-media tablet 200 to release the multi-media tablet 200 from the retention member 310 in a manner described in more detail hereinbelow.

The handle assembly 312 generally includes a lower grip portion or handle member 328 and an upper support member 330 extending from an upper end 332 of the handle member 328. While not specifically shown, a lanyard, similar to lanyard 254 above, may be provided on a bottom end 334 of the handle member 328 for attachment to a wrist of a user. The handle member 328 is additionally provided with ribs or grooves 326 to facilitate grasping by a user.

In this embodiment, the multi-media tablet holder 300 is provided with an independent camera 338 for simultaneously capturing images of video along with those captured via the camera lens 224 of the multi-media tablet 200. A camera lens 339 of the camera 338 is provided on a front surface 340 of the support member 330 and is spaced apart from the camera hole 322 in the retention plate 316 a predetermined distance to provide the desired camera separation. In contrast to the light emitting device 158 (FIG. 4) described herein above, in this embodiment, a light emitting device 342 is provided on the support member 330 rather than on the retention plate 316.

Turning now specifically to FIG. 9, the details of the articulating mechanism 314 will now be described. As noted hereinabove, the articulating mechanism 314 is provided to allow the multi-media tablet 200 to be rotated and pivoted relative to the hand of the user. The articulating mechanism generally includes a pivot or support plate 344 pivotally mounted to the support member 330, and a ratchet plate 346, affixed to a front surface 348 of the retention plate 316, and rotatably mounted on the support plate 344. In order to pivot the support plate 344 relative to the support member 330 a hinge assembly 350 is provided on a rear side 352 of the support member 330 and is connected to a bottom end 354 of the support plate 344. This allows the support plate 344, and thus the retention member 316 and multi-media tablet 200, to be pivoted forward and back relative to the handle assembly 312. The hinge assembly 350 may take various forms, such as, for example, a piano type hinge, a living hinge integrally molded into the support member 330 and the support plate 344, individual discrete hinges, etc.

With continued reference to FIG. 9, in order to rotate the multi-media tablet 200 relative to the hand of the user, the ratchet plate 346 is rotatably mounted to a rear face 356 of the support plate 344 at an upper end 358 of the support plate 344. Ratchet teeth 360 provided on the ratchet plate 346 allow the retention plate 316 to be rotated and retained in discrete increments relative to the support plate 344.

Figure 10:
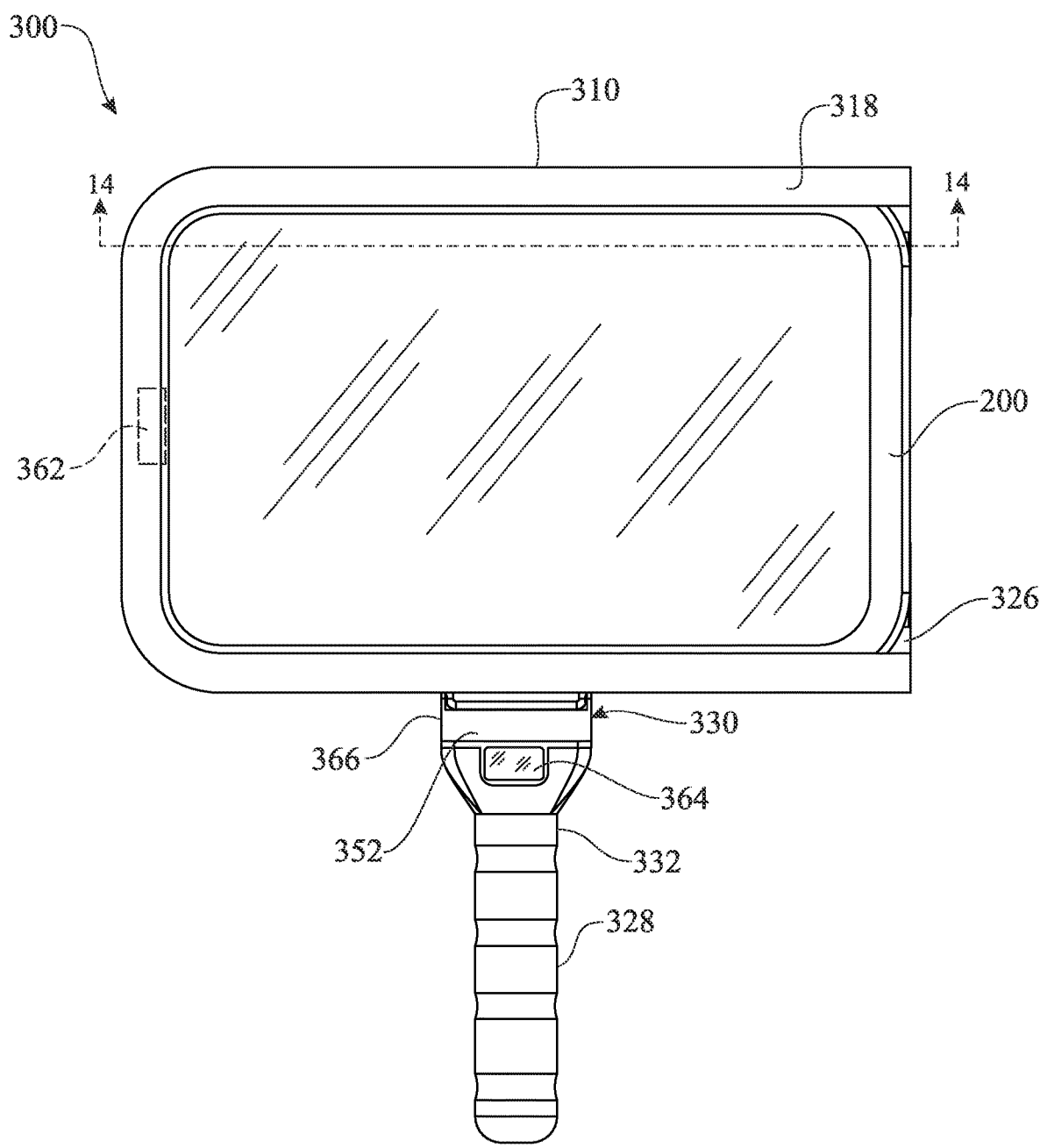
FIG. 10 presents a rear elevation view of the multi-media tablet holder of FIG. 8.

Referring to FIG. 10, the multi-media tablet holder 300 is an independent computer and camera enhanced system for use alone or in conjunction with the multi-media tablet 200. The multi-media tablet holder 300 includes a controller and memory bank (FIG. 15) contained within the handle assembly 312. A wired interface 362 is provided in the retention member 310 for a direct connection to the multi-media tablet 200 so as to control the multi-media tablet 200 directly from the multi-media tablet holder 300. A small touch screen 364 is provided on a lower end 366 of the support member 330 on the rear side 352 thereof to allow for user inputs to the multi-media tablet holder 300 and the multi-media tablet 200. The touch screen 364 is positioned just above the upper end 332 of the handle member 328 to allow operation of the touch screen 364 by a thumb or finger of the user.

Figure 11:
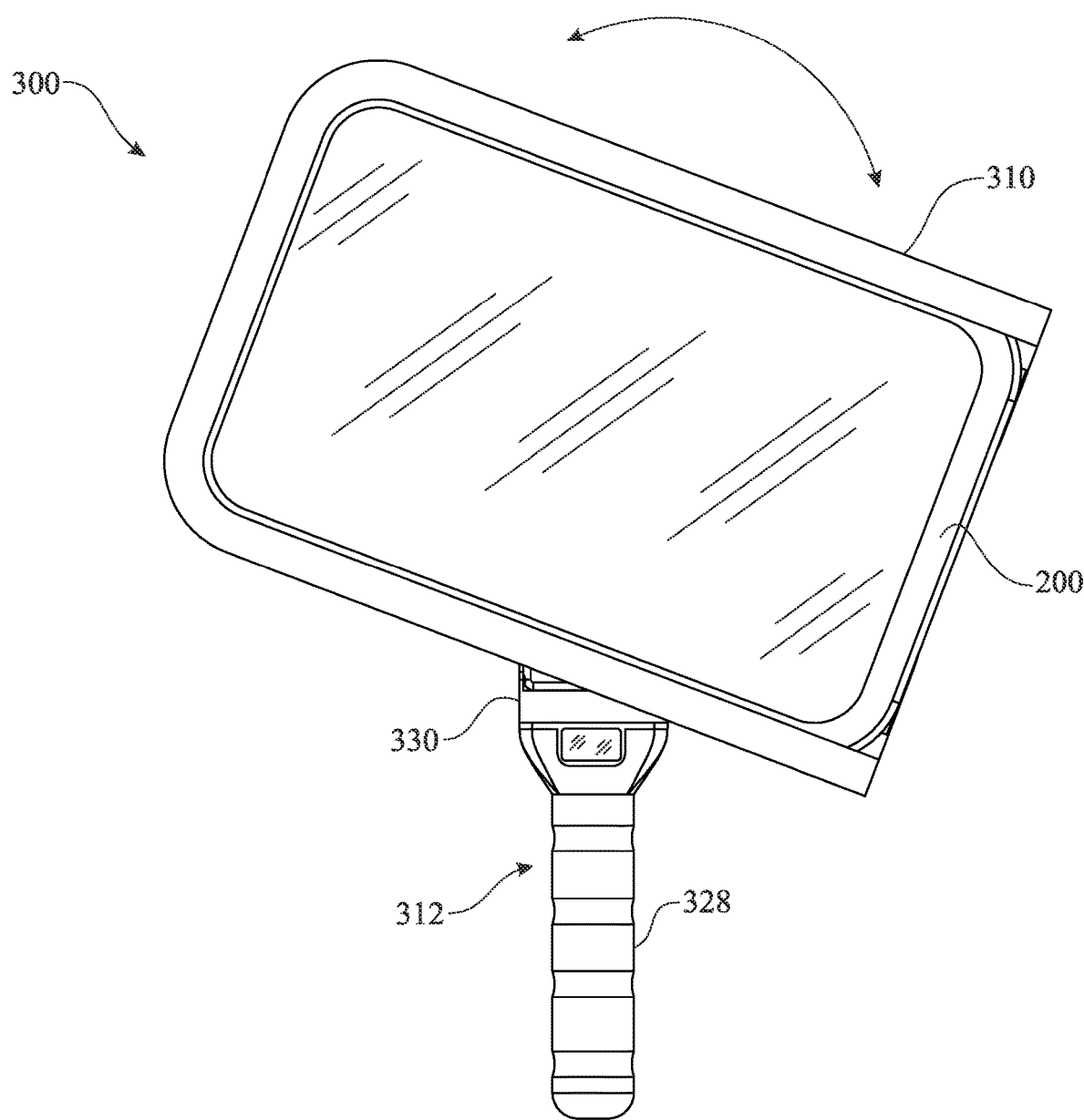
FIG. 11 presents a rear elevation view of the multi-media tablet holder of FIG. 8 with a retention member partially rotated relative to an ergonomic handle assembly.
Figure 12:
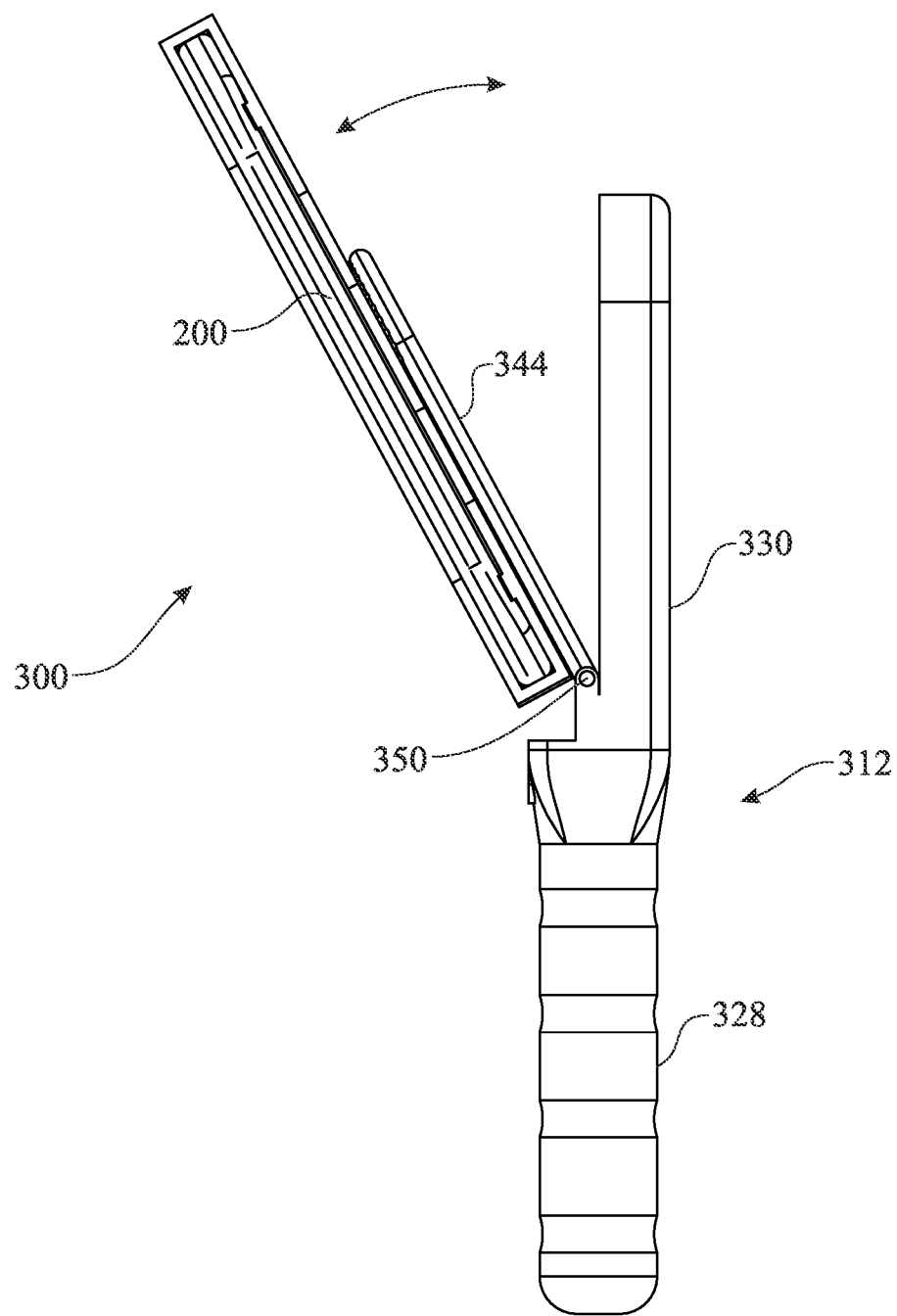
FIG. 12 presents a side elevation view of the multi-media tablet holder of FIG. 8 with the retention member partially tilted rearward relative to the ergonomic handle assembly.

Referring for the moment to FIGS. 9, 11 and 12, the articulating mechanism 314 (FIG. 9) permits the retention member 310 and retained multi-media tablet 200 to be both rotated (FIG. 11) and pivoted (FIG. 12) relative to the support member 330 and the handle member 328. This allows for multiple viewing angles as well as positioning of the camera lens 224 of the multi-media tablet 200. Another important advantage of the pivoting and rotating capabilities of the retention member 310 is that such rotation and/or pivoting alters the angles of the camera lens 224 of the multi-media tablet 200 and the camera 338 provided on the support member 330 of the multi-media tablet holder 300. This allows for more creativity when composing still or video images. Importantly, this also allows for flexibility of the viewing angles of the camera lenses 224, 339 with respect to the multi-media tablet holder 300 and with respect to the display of the multi-media tablet 200.

Figure 13:
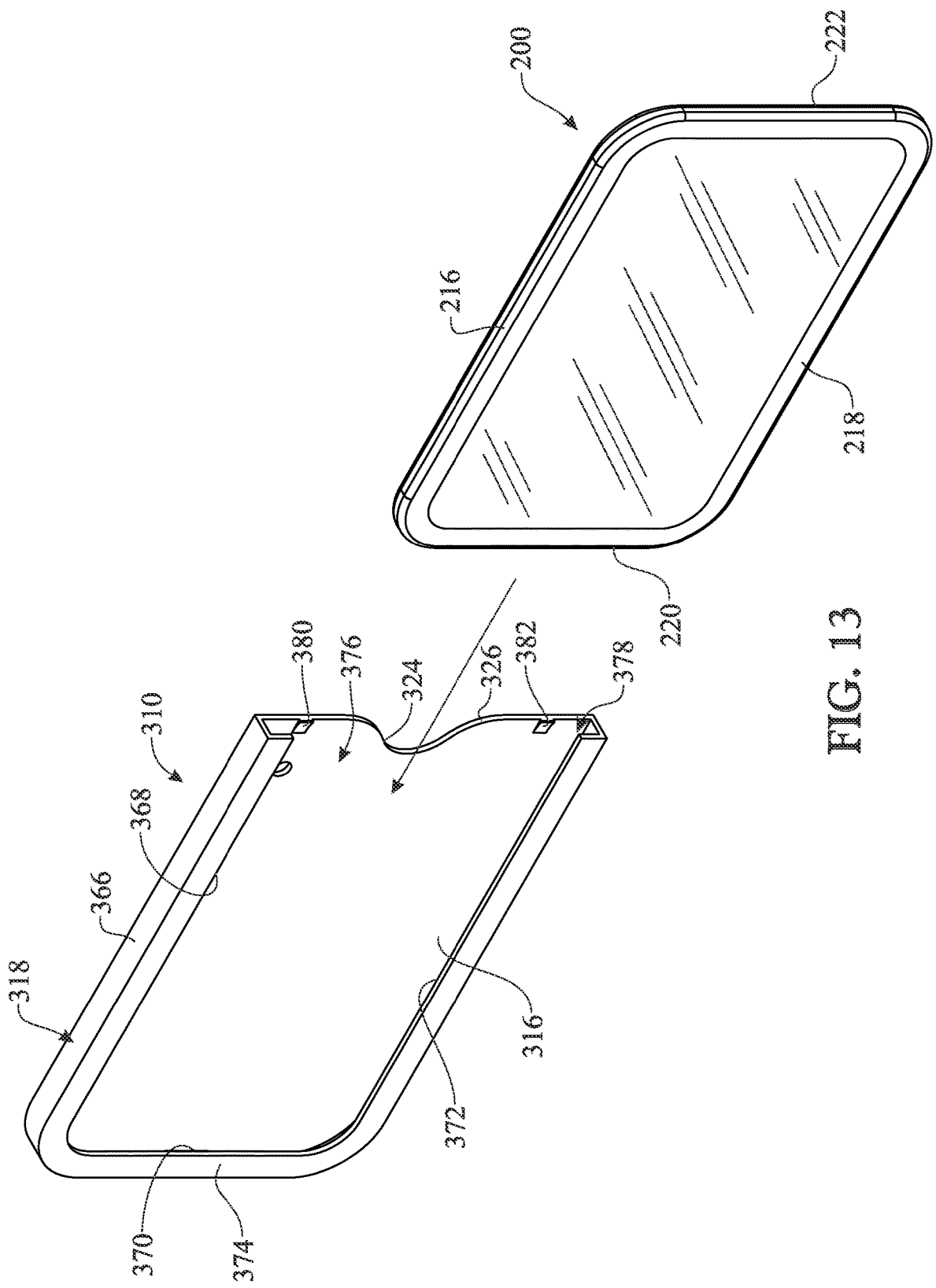
FIG. 13 presents an exploded perspective view of the retention member of the multi-media tablet holder and multi-media tablet of FIG. 8.

With reference to FIG. 13, in contrast to the multi-media tablet holder 100 described hereinabove, the multi-media tablet holder 300 utilizes the single retention member 310 to hold and support the multi-media tablet 200. In this embodiment, the retention rail 318 includes a continuous arm 366 extending from and around an upper edge 368, a closed side edge 370 and a lower edge 372 of the retention plate 316. Likewise, a continuous lip 374 extends inwardly from the continuous arm 366. The continuous arm 366 and the continuous lip 374 extend from a rear face 376 of the retention plate 316 to define a continuous channel 378 for receipt of the multi-media tablet 200. Specifically, the upper edge 216, the lower edge 218 and the first side edge 220 of the multi-media tablet 200 are received within the continuous channel 278 of the retention member 310.

In order to retain the multi-media tablet 200 within the retention rail 318, a pair of tabs 380 and 382 are provided on the rear face 376 and adjacent the open end 326 of the retention member 310. The tabs 380 and 382 are designed to block the multi-media tablet 200 from sliding out of the retention member 310 by engagement with the second side edge 222 of the multi-media tablet 200. To release the multi-media tablet 200 from the retention member 310, the multi-media tablet 200 is pushed away from the tabs 380 and 382 by pressing on the multi-media tablet 200 through the cutout 324 in the open end 326. The retention plate 316 can flex slightly to allow the multi-media tablet 200 to be released from the tabs 380 and 382.

Figure 14:
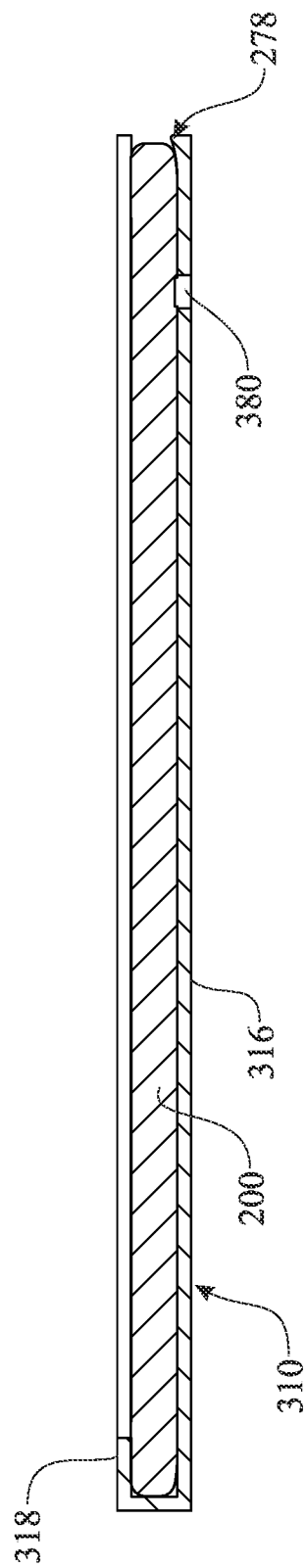
FIG. 14 presents a sectional view of the multi-media tablet holder and multi-media tablet, taken along line 14-14 in FIG. 10.

As best shown in FIG. 14, the multi-media tablet 200 is additionally received within the continuous channel 278 of the retention member 310 in friction fit fashion to further prevent the multi-media tablet 200 form sliding out of the multi-media tablet holder 300. This friction fit, along with tabs 380 and 382, further prevent potential damage to the multi-media tablet 200 caused by, for example, accidentally dropping the tablet 200.

Figure 15:
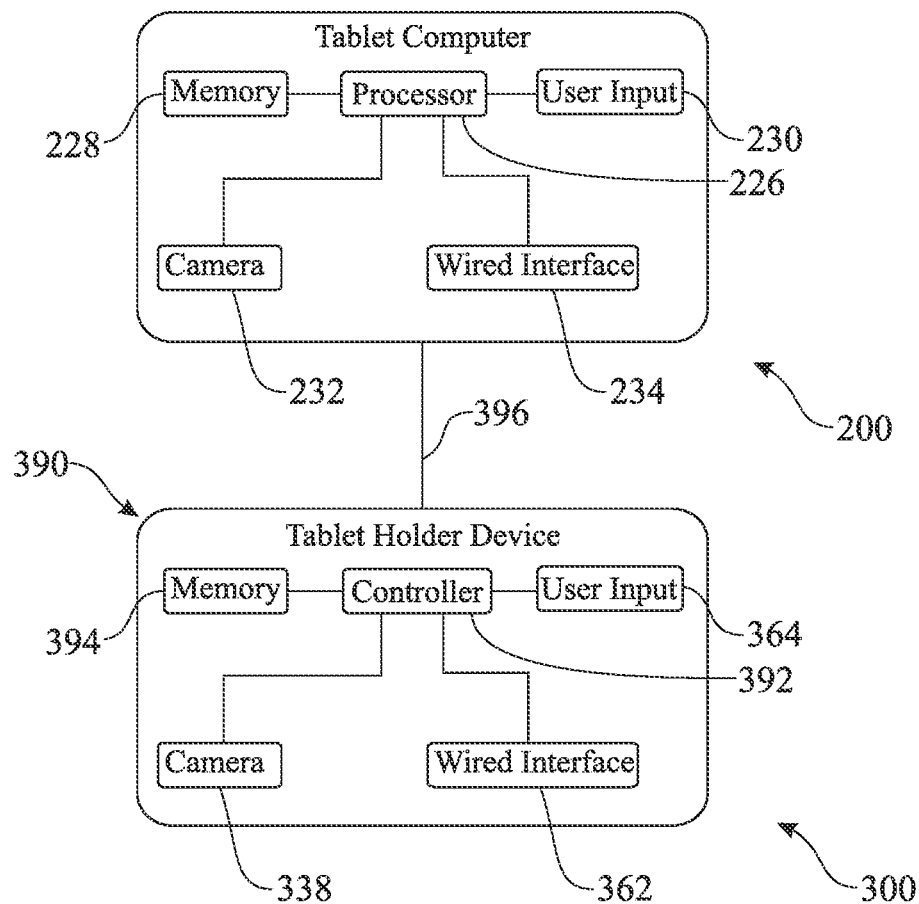
FIG. 15 presents a flow chart of the functions of the multi-media tablet holder and multi-media tablet of FIG. 8.

Referring to FIG. 15, and as noted hereinabove, the multi-media tablet holder 300 is a fully functional integrated computer and camera system 390 including a controller 392 and a memory 394. The system 390 additionally includes the camera 338 (See also FIG. 8), the user input or interface, presented in the form of the touch screen 364, and the wired interface 362 for connection to the multi-media tablet 200 (See also FIG. 10). The wired interface 362 may be, for example, a Universal Serial Bus (USB) connection. Similarly, the multi-media tablet 200 includes a processor 226, a memory 228 and a user input 230, presented in the form of the touch screen 214 (FIG. 1). The multi-media tablet 200 additionally includes a camera 232 having camera lens 224 (FIG. 8) and a wired interface 234 for interconnection with the wired interface 362 of the multi-media tablet holder 300 via a communication link 396. Although the exemplary implementations shows the user interface as a touch screen 364, it is understood that the user interface may be in any form, known in the art, provided that it allows a user to input commands that are received into the computer and camera system 390. It is understood that a software application can be stored in memory 394 that includes a computer instruction set, executed by the controller 392, which controls switching between the camera 338 and the camera 232 in accordance with, for example, user input commands received via the user input interface 364 on the tablet holder 300 or the user input interface 230 on the multi-media tablet 200.

By integrating the multi-media tablet 200 with the multi-media tablet holder 300, greater creativity can be achieved in producing videos. For example, a user can selectively alternate between utilizing video captured by the camera 338 on the tablet holder 300 and utilizing video captured by the camera 232 on the multi-media tablet 200 in accordance with a user desired video capturing angle.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

What is claimed is:

1. An electronic handheld camera supporter with a user interface, a memory bank, and an articulating mechanism assembly with two separate joints being elements of an integrated image capturing system designed to allow the electronic alternation between at least two different recordable directions comprising:
    an articulating mechanism;
    a handle assembly; the handle assembly including a handgrip portion and the user interface; the handgrip portion designed for grasping by the hand of the user;
    a camera support device; the articulating mechanism supporting the camera support device and enabling the camera support device to be rotated and maintained in discrete increments,
    wherein the camera support device is rotated in four different directions by the two separate joints of the articulating mechanism relative to the handgrip portion, two of the four different directions capable of being executed simultaneously,
    the articulating mechanism enabling the camera support device to rotate on an axis that is parallel to a plane defined by a display screen and rotate on an axis extending in a direction that a lens of a camera can face when the camera is supported by the electronic handheld camera supporter;
    wherein the electronic handheld camera supporter is configured to be in signal communication with the camera; and
    the memory bank being configured to store a software.

2. The electronic handheld camera supporter as recited in claim 1, wherein the electronic handheld camera supporter is configured to interface with a peripheral device.

3. The electronic handheld camera supporter as recited in claim 1, further comprising a connection interface, wherein the connection interface is configured to integrate the electronic handheld camera supporter with a peripheral device.

4. The electronic handheld camera supporter as recited in claim 2, wherein the peripheral device is at least one of the following,
    (a) the camera,
    (b) a portable computing device,
    (c) a device with a screen,
    (d) a device with a touch screen,
    (e) a device with a memory,
    (f) a device enabling video to be viewed by a user and,
    (g) a device with access to internet.

5. The electronic handheld camera supporter as recited in claim 1, wherein the camera support device rotates on at least two separate axes, the at least two separate axes are provided by at least two separate rotational elements, the at least two separate rotational elements arranged in sequence, the at least two separate rotational elements being spaced apart by at least one bracket.

6. The electronic handheld camera supporter as recited in claim 1, wherein the handle assembly includes a support body.

7. The electronic handheld camera supporter as recited in claim 6, wherein the support body has an electronic component.

8. The electronic handheld camera supporter as recited in claim 7, wherein the articulating mechanism is assembled to the support body of the handle assembly.

9. The electronic handheld camera supporter as recited in claim 8, wherein the articulating mechanism is assembled to the support body of the handle assembly by way of a rotating element.

10. The electronic handheld camera supporter as recited in claim 1, wherein the electronic handheld camera supporter is configured with a memory device.

11. The electronic handheld camera supporter as recited in claim 10, wherein the memory device is configured to store software that includes computer instruction set executed by a processor which integrates two electronic devices, one of the two electronic devices having a camera.

12. The electronic handheld camera supporter as recited in claim 1, wherein the electronic handheld camera supporter is configured to do one of the following:
    a) transmit data, and
    b) receive data,
    c) process data, and
    d) send data to a device to be processed.

13. The electronic handheld camera supporter as recited in claim 1, wherein the electronic handheld camera supporter is configured with at least one light emitting feature.

14. The electronic handheld camera supporter as recited in claim 13, wherein the light emitting feature is configured with the handle assembly.

15. The electronic handheld camera supporter as recited in claim 1, further comprising a second user interface.

16. The electronic handheld camera supporter as recited in claim 15, wherein the second user interface is in the form of one of the following,
    a) a touch panel interface, and
    b) a touch screen interface.

17. The electronic handheld camera supporter as recited in claim 1, wherein the integrated image capturing system is a computer system, the computer system comprising of at least one of the following,
    (a) a processor,
    (b) a memory,
    (c) a second user interface,
    (d) a software stored in a memory enabling a user to manipulate a camera by way of a second user interface configured with the electronic handheld camera supporter,
    (e) a software stored in a memory enabling a user to manipulate at least one element of the electronic handheld camera supporter by way of a second user interface configured with the electronic handheld camera supporter, (f) a software stored in a memory enabling a user to use a second user interface of a peripheral device to control at least one element of the electronic handheld camera supporter,
(g) a software stored in memory allowing a peripheral device to integrate with the electronic handheld camera supporter,
(h) at least one connection interface,
(i) the user interface in the form of a touch screen,
(j) a camera, and
(k) a Universal Serial Bus interface (USB).

18. The electronic handheld camera supporter as recited in claim 3, wherein the connection interface is a serial interface.

19. The electronic handheld camera supporter as recited in claim 1 wherein the handle assembly provides an ergonomic feature, the ergonomic feature being at least one of the following,
    (a) at least one finger groove,
    (b) at least one rib,
    (c) an electronic switch,
    (d) at least one groove,
    (e) at least one feature to facilitate grasping by a user,
    (f) at least one grip enhancing feature,
    (g) at least one grip enhancing surface
    (h) the handgrip portion in the shape of a pistol grip,
    (i) at least one foam surface, and
    (j) at least one pliant surface.

20. The electronic handheld camera supporter as recited in claim 1, wherein the handgrip is carrying a touchscreen.

21. An electronic handheld device supporter with a display screen, a memory bank, a camera controller, an articulating mechanism assembly configured to support a device with a display screen, and a software enabling the electronic manipulation of a camera using one or two hands of a user comprising:
    the software enabling operation of the camera;
    a handle assembly with the camera controller;
    the handle assembly having a handgrip portion, the handgrip portion designed to be grasped by the hand of the user,
    a support device; the articulating mechanism assembly designed to attach the handle assembly and the support device to one another,
    the articulating mechanism assembly having a rotational element enabling the device with the display screen to rotate in two separate rotational directions relative to the camera controller,
    the device with the display screen able to communicate with the electronic handheld device supporter via a communication link, the communication link containing data relating to the electronic manipulation of the camera, wherein the electronic handheld device supporter has a connection port.

* * * * *